United States Patent
Enrici et al.

(10) Patent No.: US 12,164,426 B2
(45) Date of Patent: Dec. 10, 2024

(54) RECONFIGURABLE CACHE HIERARCHY FRAMEWORK FOR THE STORAGE OF FPGA BITSTREAMS

(71) Applicant: Nokia Solutions and Networks Oy, Espoo (FI)

(72) Inventors: Andrea Enrici, Bourge la Reine (FR); Julien Lallet, Lannion (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/329,277

(22) Filed: Jun. 5, 2023

(65) Prior Publication Data

US 2023/0315634 A1 Oct. 5, 2023

Related U.S. Application Data

(62) Division of application No. 17/095,109, filed on Nov. 11, 2020, now Pat. No. 11,669,452.

(51) Int. Cl.
| | |
|---|---|
| *G06F 12/0811* | (2016.01) |
| *G06F 12/0804* | (2016.01) |
| *G06F 12/0813* | (2016.01) |
| *G06F 12/0871* | (2016.01) |
| *G06F 13/16* | (2006.01) |

(52) U.S. Cl.
CPC ...... *G06F 12/0811* (2013.01); *G06F 12/0804* (2013.01); *G06F 12/0813* (2013.01); *G06F 12/0871* (2013.01); *G06F 13/1668* (2013.01)

(58) Field of Classification Search
None
See application file for complete search history.

(56) References Cited

U.S. PATENT DOCUMENTS

| | | |
|---|---|---|
| 2009/0300293 A1 | 12/2009 | Mantor et al. |
| 2011/0307661 A1 | 12/2011 | Smith et al. |
| 2011/0320740 A1 | 12/2011 | Ambroladze et al. |
| 2016/0098193 A1 | 4/2016 | Shiu |
| 2017/0054627 A1 | 2/2017 | Rossi et al. |

(Continued)

FOREIGN PATENT DOCUMENTS

| | | |
|---|---|---|
| NL | 2029116 A | 6/2022 |
| NL | 2030226 A | 7/2022 |
| WO | WO-2023014252 A1 | 2/2023 |

OTHER PUBLICATIONS

Gindraud, F., "Distributed run-time system with global address space and software cache coherence for a data-flow task model", THÈSE Pour obtenir le grade de Docteur De L'Université Grenoble Alpes Spécialité : Informatique Arrête ministèriel : May 25, 2016.

(Continued)

*Primary Examiner* — Charles J Choi
(74) *Attorney, Agent, or Firm* — HARNESS, DICKEY & PIERCE, P.L.C.

(57) ABSTRACT

A network-based apparatus includes at least one processor and at least one memory including computer program code. The at least one memory and the computer program code are configured to, with the at least one processor, cause the network apparatus to configure a cache manager according to a cache management policy identified in a request from a network orchestrator, the cache manager managing a cache of a multi-level cache hierarchy, the cache storing bitstreams for configuring a programmable device.

6 Claims, 10 Drawing Sheets

(56) References Cited

U.S. PATENT DOCUMENTS

2019/0354489 A1   11/2019   Gupta et al.
2020/0167281 A1   5/2020    Flores et al.
2022/0066690 A1   3/2022    Liu et al.

OTHER PUBLICATIONS

Alonso, G., *"Data Processing on Modern Hardware"*, Institute for Computing Platforms—Systems Group | ETH Zurich, https://www.systems.ethz.ch/fpga <https://protect-us.mimecast.com/s/PSZLCVO5Aos07qOGtQQDcF?domain=systems.ethz.ch>.

Sembrant, A. et al., "Data Placement Across the Cache Hierarchy: Minimizing Data Movement with Reuse-Aware Placement", IEEE 2016, pp. 117-124.

Weerasinghe, J. et al., "Enabling FPGAs in Hyperscale Data Centers", IEEE 2015, pp. 1078-1086.

European Communication under Rule 71(3) EPC for European Application No. 21199248.2 mailed Jan. 30, 2024.

European Intention to Grant for European Application No. 21199248.2 mailed Dec. 8, 2023.

Screen capture from YouTube video clip entitled "FPGAs in the cloud," uploaded on Nov. 3, 2017 by user "Juien Simon". Retrieved from Internet: « https://www.youtube.com/watch?v=SFyW2HVimiU>.

Screen capture from YouTube video clip entitled "Xilinx Developer Forum Frankfurt 2018—FPGA Accelerated Cloud Servers (FACS)," uploaded on Jan. 22, 2018 by user "silinxlnc". Retrieved from Internet: «<https://www.youtube.com/watch?v=NdFGVulJt5U».

Huawei, "Huawei Cloud marketplace," Retrieved from Internet: <https://marketplace-intl.huaweicloud.com« on Aug. 27, 2020.

Fei Chen et al., "Enabling FPGAs in the cloud," May 2014, retrieved from<http://nics.ee.tsinghua.edu.cn/people/wangyu/Enabling%20FPGAs%20in%20the%20Cloud.pdf>.

IBM, "cloudFPGA Field programmable gate arrays for the cloud," retrieved on Aug. 25, 2020, from Internet: <https://www.zurich.ibm.com/cci/cloudFPGA/>.

Huawei, "FX-Series FPGA Accelerator Cards; Unlock new levels of energy efficiency to turbocharge data centers," retrieved on Aug. 25, 2020, from the internet, <https://e.huawei.com/en/products/servers/pcie-ssd/fpga>.

Huawei, "FPGA Accelerated Cloud Server," retrieved on Aug. 25, 2020 and from the internet <https://www.huaweicloud.com/en-us/product/fcs.html>.

ORACLE Labs, "FPGA Offload," retrieved on Aug. 25, 2020 and from <https://labs.oracle.com/pls/apex/f?p=LABS:project_details:0:128>.

Neal Oliver et al., "A Reconfigurable Computing System Based on a Cache-Coherent Fabric," 2011 International Conference on Reconfigurable computing and FPGAs, IEEE, Nov. 30-Dec. 2, 2011, Mexico.

Irina Calciu et al., "Project PBerry: FPGA Acceleration for Remote Memory," HotOS'19, May 13-15, 2019, Bertinoro, Italy.

Extended European Search Report issued Mar. 1, 2022 in European Application No. 21199248.2.

| FPGA MODEL | PROVIDER | SHELL TYPE | PARTITION ID | BITSTREAM | BITSTREAM POINTER | VBIT | FCOUNTER |
|---|---|---|---|---|---|---|---|
| MODEL A | COMPANY A | 3U_TYPE | 0x1 | | 0xAB98 | 1 | 5 |
| MODEL B | COMPANY B | 4U_TYPE | 0x4 | | 0xACC01 | 0 | 2 |

FIG. 5

RECONFIGURABLE CACHE HIERARCHY FRAMEWORK FOR THE STORAGE OF FPGA BITSTREAMS

CROSS-REFERENCE TO RELATED APPLICATION

This is a divisional of U.S. application Ser. No. 17/095,109, filed Nov. 11, 2020, the disclosure of which is incorporated herein by reference in its entirety.

BACKGROUND

A field-programmable gate array (FPGA) is an integrated circuit designed to be configured after manufacturing. FPGAs contain an array of Configurable Logic Blocks (CLBs), and a hierarchy of reconfigurable interconnects that allow these blocks to be wired together, like many logic gates that can be inter-wired in different configurations. CLBs can be configured to perform complex combinational functions, or merely simple logic gates like AND and XOR. CLBs also include memory blocks, which may be simple flip-flops or more complete blocks of memory, and specialized Digital Signal Processing blocks (DSPs) preconfigured to rapidly execute some common operations (e.g., filters).

FPGAs can be reprogrammed to implement different logic functions, allowing flexible reconfigurable computing as performed in computer software.

SUMMARY

The scope of protection sought for various embodiments of the invention is set out by the independent claims. The example embodiments and/or features, if any, described in this specification that do not fall under the scope of the independent claims are to be interpreted as examples useful for understanding various embodiments.

One or more example embodiments provides multi-level cache hierarchy for storing bitstreams, the multi-level cache hierarchy comprising: a first cache level having a first cache to store a first set of the bitstreams, the first cache having a first access time and a first storage capacity; a second cache level having a second cache to store a second set of the bitstreams, the second cache having a second access time and a second storage capacity, the second access time being greater than the first access time and the second storage capacity being greater than the first storage capacity; and a third cache level having a third cache to store a third set of the bitstreams, the third cache having a third access time and a third storage capacity, the third access time being greater than the second access time and the third storage capacity being greater than the second storage capacity.

According to one or more example embodiments, the first set of the bitstreams may be local to a single FPGA node. The third set of the bitstreams may be accessible by a plurality of FPGA nodes, and the second set of the bitstreams may be accessible by a subset of FPGA nodes from among the plurality of FPGA nodes. The first set of the bitstreams may be accessible by a FPGA among the subset of FPGA nodes.

One or more example embodiments provide a network-based apparatus to manage a cache memory in a multi-level cache hierarchy, the network-based apparatus comprising: processing circuitry configured to sequentially search a cache at each level of the multi-level cache hierarchy for a requested bitstream based on a pointer associated with the requested bitstream and in response to a request for a network service at a programmable device; determine that the requested bitstream is not present in at least one of the caches; fetch the requested bitstream from a central repository based on the pointer in response to determining that the requested bitstream is not present in the at least one of the caches; and program the programmable device based on the requested bitstream fetched from the central repository. The programmable device may be a FPGA.

One or more example embodiments provide a network-based apparatus to manage a cache memory in a multi-level cache hierarchy, the network-based apparatus comprising: means for sequentially searching a cache at each level of the multi-level cache hierarchy for a requested bitstream based on a pointer associated with the requested bitstream and in response to a request for a network service at a programmable device; means for determining that the requested bitstream is not present in at least one of the caches; means for fetching the requested bitstream from a central repository based on the pointer in response to determining that the requested bitstream is not present in the at least one of the caches; and means for programming the programmable device based on the requested bitstream fetched from the central repository. The programmable device may be a FPGA.

One or more example embodiments provide a method of operating a network-based apparatus to manage a cache memory in a multi-level cache hierarchy, the method comprising: sequentially searching a cache at each level of the multi-level cache hierarchy for a requested bitstream based on a pointer associated with the requested bitstream and in response to a request for a network service at a programmable device; determining that the requested bitstream is not present in at least one of the caches; fetching the requested bitstream from a central repository based on the pointer in response to determining that the requested bitstream is not present in the at least one of the caches; and programming the programmable device based on the requested bitstream fetched from the central repository. The programmable device may be a FPGA.

One or more example embodiments provide a non-transitory computer-readable storage medium storing computer-readable instructions that when executed by a network-based apparatus, cause the network-based apparatus to perform a method for managing a cache memory in a multi-level cache hierarchy, the method comprising: sequentially searching a cache at each level of the multi-level cache hierarchy for a requested bitstream based on a pointer associated with the requested bitstream and in response to a request for a network service at a programmable device; determining that the requested bitstream is not present in at least one of the caches; fetching the requested bitstream from a central repository based on the pointer in response to determining that the requested bitstream is not present in the at least one of the caches; and programming the programmable device based on the requested bitstream fetched from the central repository. The programmable device may be a FPGA.

According to one or more example embodiments, the processing circuitry may be configured to fetch other bitstreams from the central repository based on the pointer associated with the requested bitstream.

The processing circuitry may be configured to: determine that the requested bitstream is present in at least one of the caches; obtain the requested bitstream from the at least one of the caches; and program the programmable device based on the requested bitstream obtained from the at least one of the caches.

The network-based apparatus may further include a first cache at a first level of the multi-level hierarchy. The processing circuitry may be configured to dynamically adjust at least one of a cache management policy or a cache memory size for the first cache, at run-time based on information from a central cache controller.

The network-based apparatus may further include a cache at each of a plurality of levels of the multi-level hierarchy. The processing circuitry may be configured to dynamically adjust at least one of a cache management policy or a cache memory size for the cache at each of the plurality of levels, at run-time based on information from a central cache controller.

The processing circuitry may be a slot at the programmable device, and the programmable device may be a FPGA.

The pointer may be based on static characteristics and dynamic characteristics of the requested bitstream.

The static characteristics may include at least one of a FPGA model, bitstream producer or shell type for the requested bitstream.

The dynamic characteristics may include a number of prior instantiations of the requested bitstream.

One or more example embodiments provide a network-based apparatus comprising: at least one processor and at least one memory including computer program code. The at least one memory and the computer program code are configured to, with the at least one processor, cause the network apparatus to configure a cache manager according to a cache management policy identified in a request from a network orchestrator, the cache manager managing a cache of a multi-level cache hierarchy, the cache storing bitstreams for configuring a programmable device. The programmable device may be a FPGA.

One or more example embodiments provide a network-based apparatus comprising: at least one memory including computer program code; and means for configuring a cache manager according to a cache management policy identified in a request from a network orchestrator, the cache manager managing a cache of a multi-level cache hierarchy, the cache storing bitstreams for configuring a programmable device. The programmable device may be a FPGA.

One or more example embodiments provide a method for operating a network-based apparatus, the method comprising: configuring a cache manager according to a cache management policy identified in a request from a network orchestrator, the cache manager managing a cache of a multi-level cache hierarchy, the cache storing bitstreams for configuring a programmable device. The programmable device may be a FPGA.

One or more example embodiments provide a non-transitory computer-readable storage medium storing computer-readable instructions that, when executed at a network-based apparatus, cause the network-based apparatus to perform a method comprising: configuring a cache manager according to a cache management policy identified in a request from a network orchestrator, the cache manager managing a cache of a multi-level cache hierarchy, the cache storing bitstreams for configuring a programmable device. The programmable device may be a FPGA.

According to one or more example embodiments, the network-based apparatus may include a library of cache management policies. The at least one memory and the computer program code may be configured to, with the at least one processor, cause the network apparatus to obtain the cache management policy from the library of cache management policies based on the request from the network orchestrator.

The at least one memory and the computer program code may be configured to, with the at least one processor, cause the network apparatus to generate pointers for the bitstreams based on static characteristics and dynamic characteristics of the bitstreams.

The static characteristics may include at least one of a FPGA model, bitstream producer or shell type for the bitstreams.

The dynamic characteristics may include a number of prior instantiations of the bitstreams.

The at least one memory and the computer program code may be configured to, with the at least one processor, cause the network apparatus to dynamically update the pointers for the bitstreams at runtime based on changes to the dynamic characteristics of the bitstreams.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIG. 5 shows a generic internal architecture of a cache memory according to example embodiments.

Figure 1:
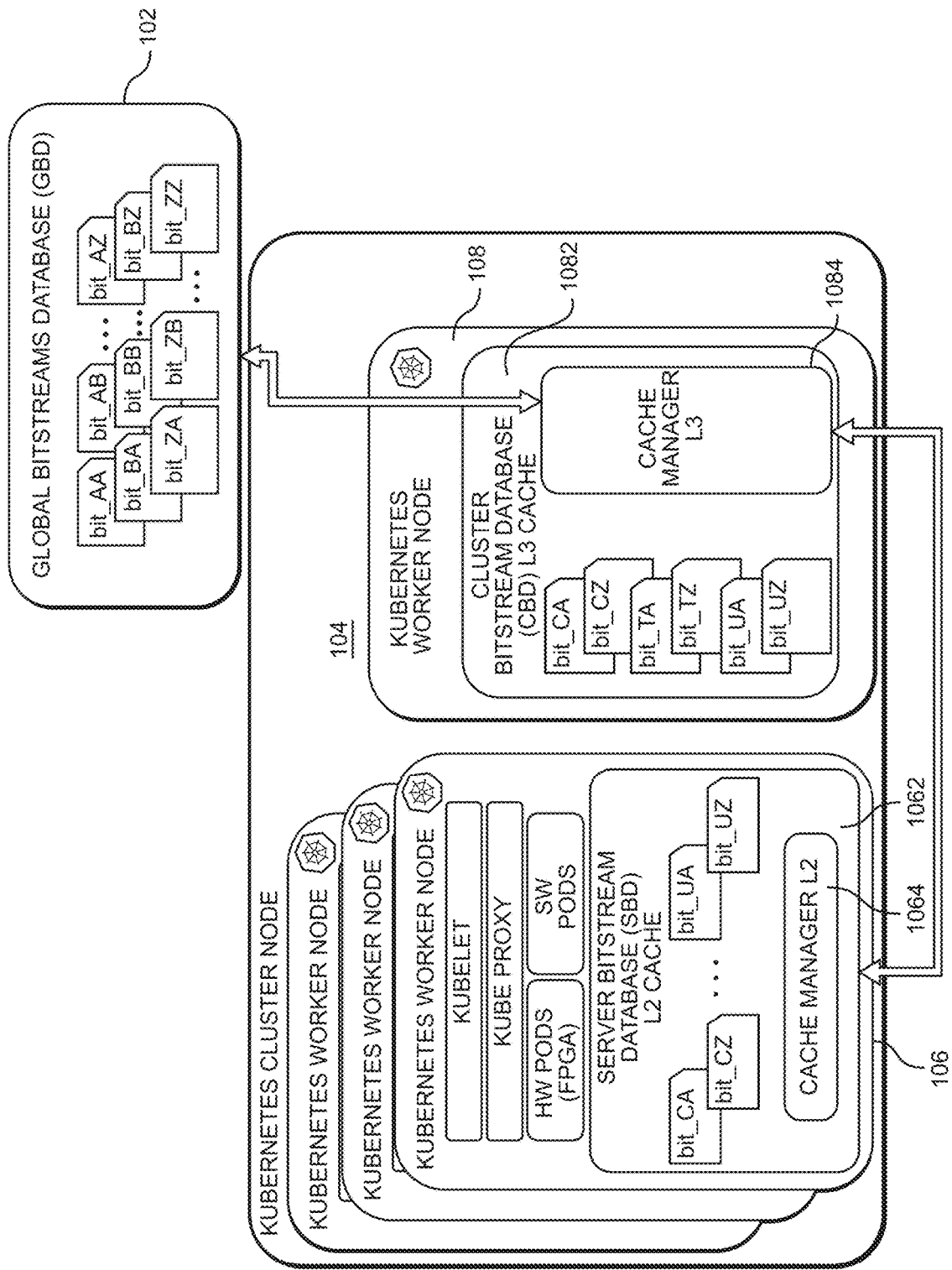
FIG. 1 illustrates an overview of a cache hierarchy according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

In modern cloud-based data centers, servers are equipped with reconfigurable hardware, such as field-programmable gate arrays (FPGAs), which is used to accelerate the computation of data-intensive or time-sensitive computations. FPGAs that are shared among multiple tenants (users) at run-time are referred to as multi-tenant FPGAs.

Apart from the evident technical advantages, multi-tenancy may enable network operators and/or manufacturers to generate more revenue than in the single-tenant case because the same reconfigurable hardware resource may be concurrently rented to multiple users.

A FPGA is programmed using a specific file to execute a desired function. The file is referred to as a FPGA bitstream (or bitstream) and includes the programming information for a FPGA. More specifically, bitstreams contain designs that implement applications (some tasks and input data to process) Bitstreams may be designed offline for specific spatial partitions of an FPGA and are specific to FPGAs that have been partitioned in compatible regions.

Conventionally, in a network with multi-tenant FPGAs, each time a user is granted access to a portion of the FPGA (e.g., as part of a virtual machine (VM) or container), a bitstream for programming the FPGA is sent over the network. The bitstream is then used to program the FPGA. Once the FPGA is programmed, the bitstream may be cached (or stored) for later use or discarded.

However, sending a bitstream each time an application is to be executed on an FPGA is relatively inefficient from the viewpoint of performance (e.g., latency) of the network and the FPGA.

To improve efficiency, reduce network traffic and/or latency, one or more example embodiments provide a multi-level reconfigurable hierarchy of caches (including a cache manager and a cache memory) in which bitstream pointers are dynamically updated based on the popularity (frequency of request) of the respective bitstreams. The hierarchy may be designed on top of a distributed shared-memory system where network nodes are equipped with CPUs and/or FPGAs that may be accessed (e.g., independently accessed) by multiple users (multi-tenancy).

At least some example embodiments enable dynamic updating of bitstream pointers to match the utilization frequency (popularity) of bitstreams and reduce the hit-and-miss ratios for bitstreams, and to reconfigure cache levels with an updated architecture and/or cache management policies to evolve with the desired performance requirements at run-time.

According to one or more example embodiments, the multi-level hierarchical architecture of bitstream caches may be designed and managed to store FPGA bitstreams (FPGA reconfiguration files) in a web scale infrastructure.

One or more example embodiments are discussed herein in the context of distributed storage of bitstreams in caches and a global bitstream database (or other central repository). More generally speaking, however, one or more example embodiments may also apply to the storage of objects that are accessed on a per-demand basis as opposed to objects that are accessed within programs with fixed control and data structures.

A cache is managed according to a cache management policy (also sometimes referred to as cache management protocol). A cache management policy is a set of rules that specify what items/data to admit to and to evict from a cache memory. A simple example is the Least Recently Used (LRU) policy, wherein items are always admitted, and when space is needed items whose last reference occurred the furthest in the past are evicted.

In accordance with one or more example embodiments, the reconfigurable cache memory structure provides for each cache management policy to utilize a set of specific bits and fields for a cache line to make management decisions (e.g., which cache line to evict when a cache is full).

Because cache management policies may change dynamically at run-time, the logical structure of a cache memory line changes according to the cache management policy in use by the cache manager.

At a given level (Lx) of the hierarchy, according to example embodiments, a cache manager (or cache logic) may be implemented in different forms (e.g., in the FPGA's reconfigurable logic or in software that executes in a CPU at the server). This may allow the system to execute any cache management policy without the need for Application Specific Integrated Circuits (ASICs). The behavior and performance of the cache hierarchy may be adapted, at run-time, to the operating conditions of the network by updating the cache manager with a more suitable cache management policy, without having to physically substitute the network hardware.

According to one or more example embodiments, FPGA bitstreams may be associated with unique pointers that are used to reference bitstreams, as opposed to memory addresses in conventional CPU caches. This mechanism may be designed to handle the case of shared multi-tenant FPGAs as well as the case of non-shared FPGAs.

For example purposes, the multi-level hierarchical architecture is discussed herein with regard to a 3-level hierarchical architecture of caches to store the bitstreams of multi-tenant FPGAs. A 3-level hierarchy matches the architecture of data-centers where FPGAs are grouped in racks, sleds and nodes. However, cache hierarchies with more or less levels are possible.

One or more example embodiments describe logic that may be embodied on a relatively large variety of existing network hardware. For instance, one or more example embodiments may be embodied in FPGAs and/or in one or more CPUs and memory (e.g., Random Access Memory (RAM), Double Data Rate (DDR) RAM, etc.) at one or more servers in a network.

To support the reconfigurable behavior offered by the multi-level cache hierarchy according to example embodiments, a central cache controller may be configured to monitor hit and miss ratios of the cache hierarchy; interface with a network orchestrator to determine needed changes in cache management policies at caches in the hierarchy that may lead to improved system performance, according to the evolution of the network working conditions; and dynamically adjust bitstream pointers to enforce temporal and/or spatial locality principles of the cache.

Figure 2:
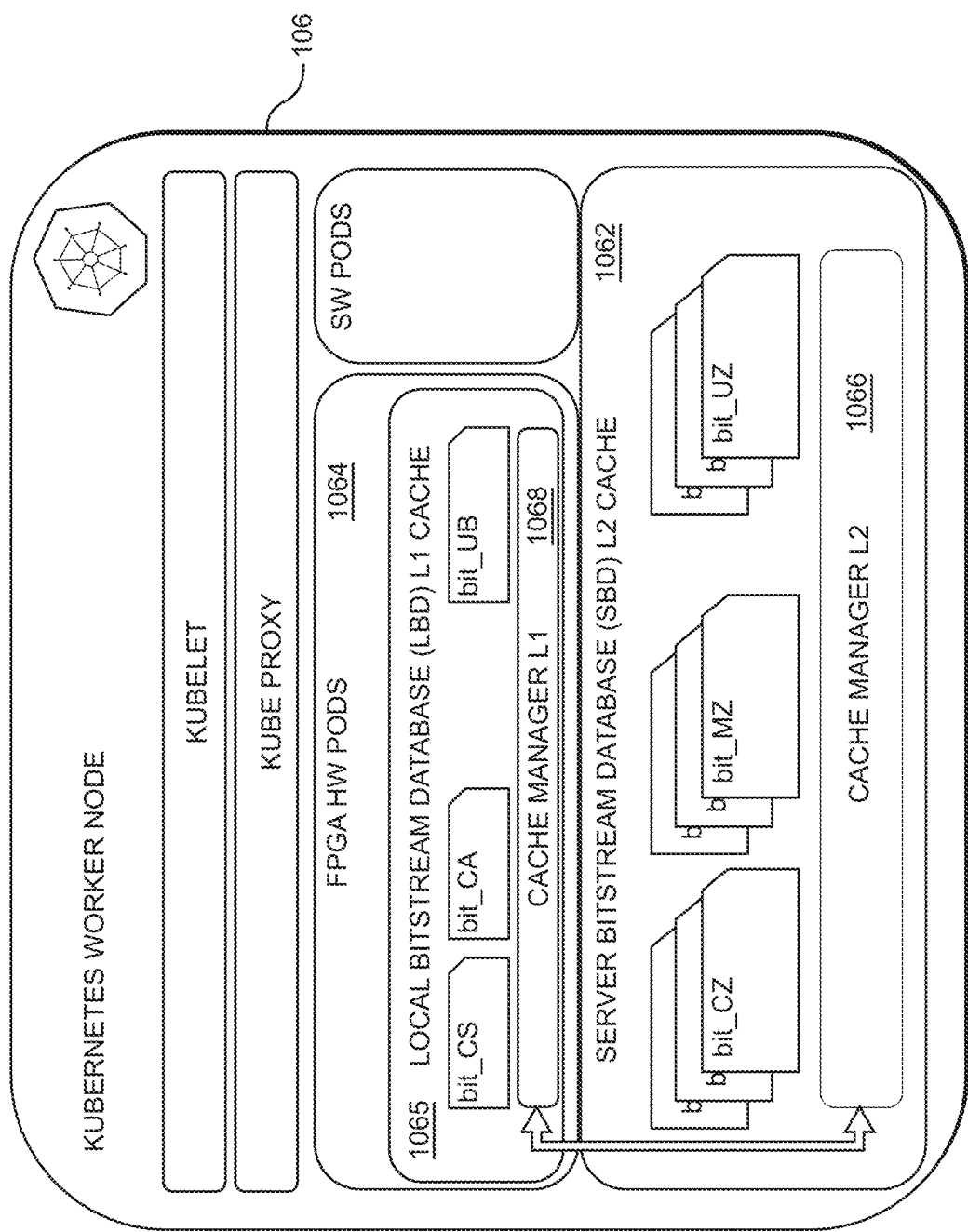
FIG. 2 illustrates a worker node according to example embodiments in more detail.

FIG. 1 illustrates a portion of a network infrastructure including a hierarchy of caches for bitstreams according to example embodiments. FIG. 2 illustrates an example embodiment of a worker node in more detail.

For example purposes, FIGS. 1 and 2 illustrate the cache hierarchy with respect to the network infrastructure as viewed from a Kubernetes (K8s) network orchestrator (not shown in FIGS. 1 and 2). Example embodiments should not, however, be limited to this example. To this end, a more generic example will be provided later with regard to FIGS. 6 and 7.

Referring to FIG. 1, the network infrastructure includes a Global Bitstreams Database (GBD) 102 and a cluster (or cluster node) 104.

The GBD 102 is a distributed database managed by a distributed database management system (DDBMS), and is the main repository for FPGA bitstreams for the FPGAs. The GBD 102 may be thought of as a shared bitstream Look-Up Table (LUT), where bitstreams bit_AA, bit_AB, . . . , bit_AZ, bitstreams bit_BA, bit_BB, . . . , bit_BZ, bitstreams bit_ZA, bit_ZB, . . . , bit_ZZ, . . . are retrieved based on unique pointers associated with the bitstreams. The pointers and generation thereof, according to example embodiments, will be discussed later.

The cluster 104 includes a plurality of worker nodes 106, 108, each of which includes one or more caches of the multi-level cache hierarchy (also referred to as a multi-level cache architecture or a multi-level hierarchical cache architecture). As mentioned above, the cache hierarchy will be discussed herein with regard to a 3-level hierarchy. However, example embodiments should not be limited to this example.

The lower-most level of the cache hierarchy (slowest access times and highest storage capacity) is referred to as the Level 3 (L3) cache or Cluster Bitstream Database (CBD)). The CBD caches bitstreams that are accessible by all FPGAs in, for example, a cluster of network nodes such as a server rack.

The intermediate level (intermediate access times and capacity) is referred to as the Level 2 (L2) cache or Server Bitstream Database (SBD). The SBD 1062 stores bitstreams accessible by all FPGAs in, for example, a sled. The SBD (or L2 cache) has access times faster than the CBD (or L3 cache), but has less capacity than the CBD (or L3 cache).

The lower-most level (fastest access, but smallest capacity) is referred to as the Level 1 (L1) cache or Local Bitstream Database (LBD). The bitstreams in the LBD are local to a single FPGA node, which is used by users that share a single FPGA node. The LBD (or L1 cache) has access times greater than both the CBD (or L3 cache) and the SBD (or L2 cache), but has a capacity less than both the CBD (or L3 cache) and the SBD (or L2 cache).

In the example embodiment shown in FIGS. 1 and 2, the worker node 108 includes a CBD 1082, and the worker node 106 includes SBD 1062 and LBD 1065. According to one or more example embodiments, each of the worker nodes may include at least a LBD 1065.

The CBD 1082 includes a L3 cache manager 1084, the SBD 1062 includes a L2 cache manager 1066, and the LBD 1065 includes a L1 cache manager 1068. In the example embodiment shown in FIGS. 1 and 2, the LBD 1065 is local to a FPGA hardware (HW) pod 1064. The HW pod 1064 is a "pod service," which is microservice implemented in a container in a Kubernetes infrastructure.

Still referring to FIGS. 1 and 2, the worker nodes 106 further include a Kubelet, Kube proxy and SW pods, each of which is well-known in the Kubernetes infrastructure, and thus, will not be discussed further here for the sake of brevity.

For example purposes, a generic cache manager at a given level of the multi-level hierarchy may be referred to as a Lx cache manager, wherein 'x' denotes the level of the cache in the cache hierarchy.

Different memory technologies may be used to host the memory portions of the caches (referred to herein as cache memories) according to one or more example embodiments. For example, the LBD 1065 may be hosted using DDR RAMs available on FPGA boards, whereas the CBD 1082 and SBD 1062 may be hosted by the hard drive of worker nodes (servers), which have larger capacities.

Although not shown in FIGS. 1 and 2, the example architecture may also include a central cache controller. The central cache controller may be implemented as a "pod service" on any of the worker nodes 106. The central cache controller according to example embodiments will be discussed in more detail.

According to one or more example embodiments, caches at one or more levels of the multi-level architecture may be reconfigurable to allow flexibility. The cache management policies and/or the size of caches may be updated at run-time by either reconfiguring the FPGA logic where the cache manager is instantiated (e.g., the slot of the FPGA executing the cache manager logic) or changing the cache manager software implementation.

Figure 3:
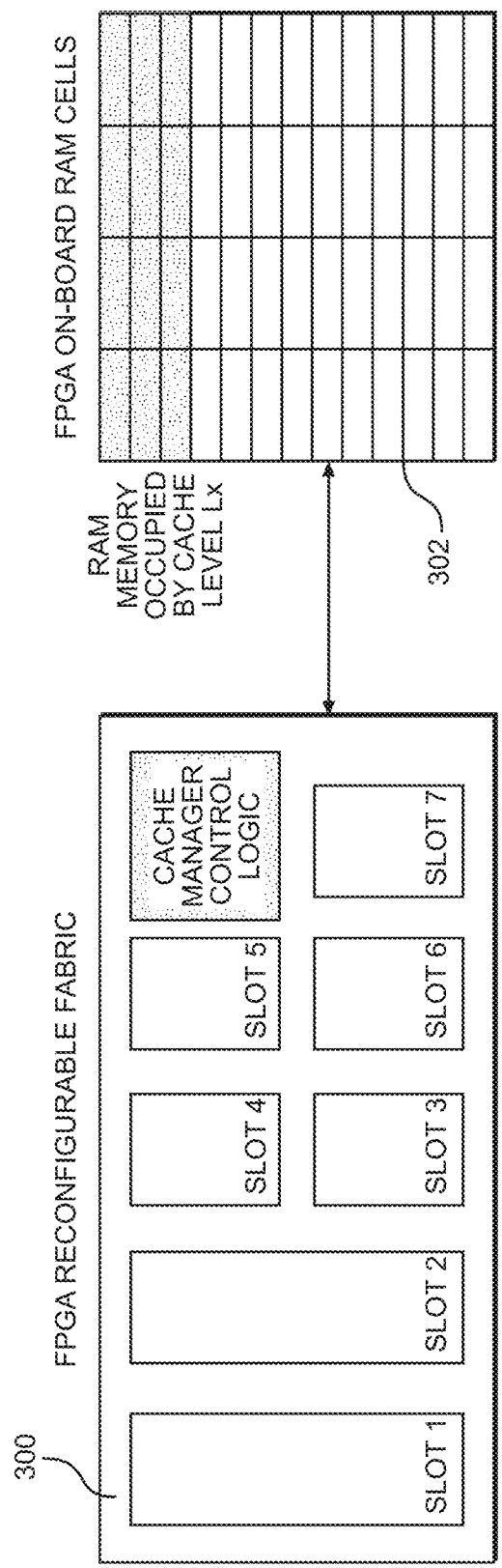
FIG. 3 illustrates a cache manager implemented in a reconfigurable logic of a Field Programmable Gate Array (FPGA) and a cache memory, according to example embodiments.
Figure 4:
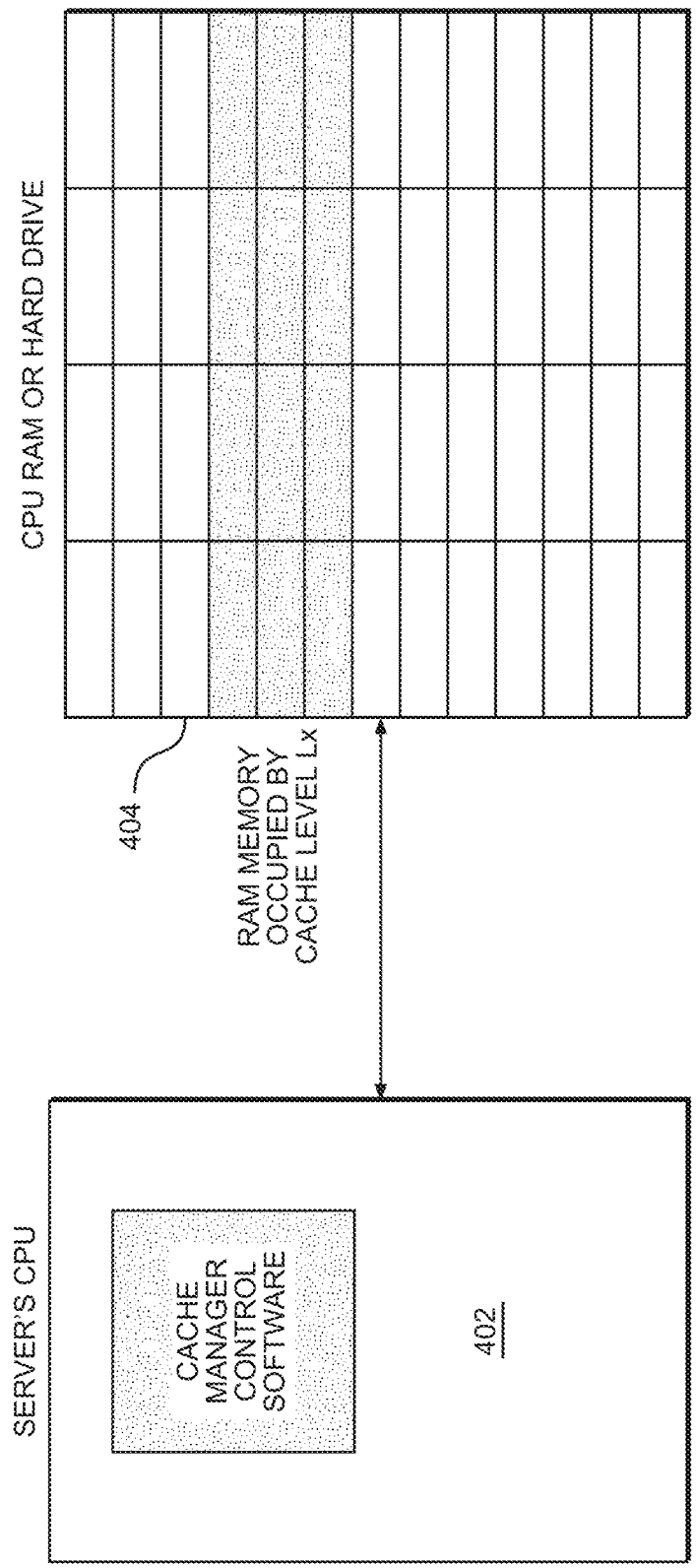
FIG. 4 illustrates a cache manager implemented as a software module on a CPU at a server and a cache memory implemented in memory at the server, according to example embodiments.

FIGS. 3 and 4 illustrate caches according to example embodiments.

In more detail, FIG. 3 illustrates an example embodiment in which the cache manager is implemented in a slot on a FPGA 300 (hardware cache manager or cache manager control logic). In the example embodiment shown in FIG. 3, the cache manager at the FPGA 300 interfaces with the cache memory 302, which, in this example, is embodied by FPGA on-board RAM cells 302.

The block diagram shown in FIG. 3 illustrates an almost empty configuration of a FPGA including eight slots, according to example embodiments. In this example, slots 1-7 are prepared to each host the execution of a network service, and slot 8 (cache manager control logic) is reserved to host the cache manager (or cache manager control logic) for a cache at a level of the cache hierarchy.

Although the example embodiment shown in FIG. 3 includes eight slots, example embodiments should not be limited to this example.

Although not shown in FIG. 3, FPGA boards also include on-chip general-purpose processors (micro-controllers). As a result, a cache manager need not necessarily be embodied as a hardware unit on a FPGA. The cache manager may be embodied as a software module that runs on the general-purpose micro-controller at the FPGA.

FIG. 4 illustrates an example embodiment in which the cache manager is implemented via software on a CPU 402 at, for example, a server (software cache manager or cache manager control software). In this example, cache manager at the server 402 interfaces with the cache memory 404 (e.g., SBD or CBD), which may be embodied by CPU RAM or a hard drive at a server.

FIG. 5 shows a generic internal architecture of a cache memory according to example embodiments. The example embodiment shown in FIG. 5 may be generic to any cache level in the hierarchy.

In the example embodiment shown in FIG. 5, each line in the cache memory is divided in two types of fields: identification related fields and cache management fields.

Identification related fields are used to access the cache and identify a specific bitstream.

Cache management fields are specific to the currently implemented cache management policy used to handle hits, misses, eviction (clearing) of bitstreams, etc.

In the example embodiment shown in FIG. 5, the identification related fields include: <FPGA model>, <Provider>, <Shell Type>, <Bitstream>, and <Bitstream Pointer>.

The <FPGA model> field includes code that uniquely identifies a FPGA.

The <Provider> field specifies the producer of the bitstream.

The <Shell Type> field is a code that denotes the type of design for which the FPGA was prepared, for example, the number of users and the amount of reconfigurable resources per user (e.g., Configurable Logic Blocks (CLBs), memory blocks, Digital Signal Processors (DSPs), etc.). In the example shown in FIG. 5, the code 3U_TYPE denotes a FPGA that was prepared to host 3 identical partitions, each for a different user. Similarly, the code 4U_TYPE denotes a FPGA that was prepared to host 4 identical partitions, each for a different user.

The <Partition ID> field includes an identifier for the user-specific partition within an FPGA design where the bitstream will be loaded and executed.

The <Bitstream> field includes the bitstream reconfiguration file (e.g., represented by its functionality, a web scale service denoted as a graph of network tasks).

The <Bitstream Pointer> field includes a pointer for the bitstream. As discussed in more detail herein, the bitstream pointer is used instead of addresses in traditional CPU caches to uniquely identify a bitstream (e.g., within the GBD, CBD, SBD and/or LBD).

Of the identification related fields, the <FPGA mode> field, the <Provider> field and the <Shell Type> field are static values.

Still referring to the example embodiment shown in FIG. 5, the cache management fields include: <VBit> and <FCounter>.

The <VBit> field includes the validity bit for the bitstream. The validity bit indicates whether a bitstream is currently valid or invalid. In one example, a bitstream may be marked as invalid when the deployment of the bitstream is changed by the network orchestrator due to an update/request from a user. In more detail, if the network service corresponding to the bitstream referenced as ABC is cancelled by a user, then bitstream ABC is marked as invalid if it was loaded in the memory system prior to its cancellation request.

The <FCounter> field includes an integer that counts how many times the bitstream has been instantiated before being marked as invalid.

The cache management fields in FIG. 5 are specific to a cache management policy that is based on the utilization frequency of bitstreams (e.g., Least Recently Used (LRU), wherein the least frequently bitstreams are evicted or removed from a full cache when a new entry is to be stored). The structure, number and/or length of these fields may vary depending on the specific cache management policy, which can be dynamically updated at run-time.

Figure 6:
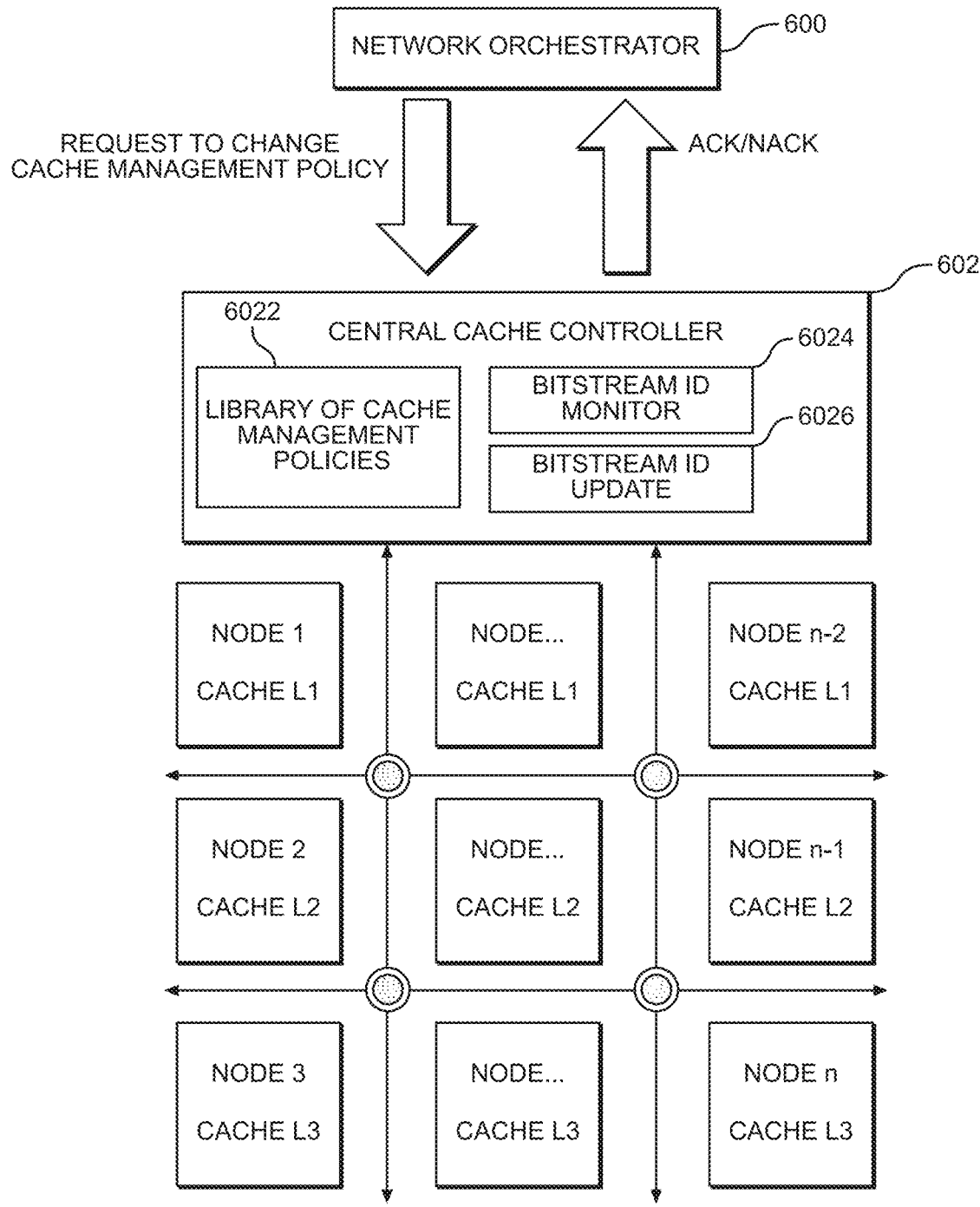
FIG. 6 illustrates a portion of a network architecture according to example embodiments.

FIG. 6 illustrates a portion of a more generic network architecture according to example embodiments.

Referring to FIG. 6, the portion of the network architecture includes a central cache controller 602 in two-way communication with a network orchestrator 600 and a set of network nodes Node 1, Node 2, Node 3, ... Node n. Each of the network nodes shown in FIG. 6 may include, among other things, at least one Lx cache of the multi-level cache hierarchy. The Lx cache may include a cache manager and a cache memory. A network node will be discussed in more detail later with regard to FIG. 7.

The network orchestrator 600 is generally known and will not be discussed in detail here for the sake of brevity.

The central cache controller 602 includes a library of cache management policies 6022, a bitstream ID monitor 6024 and a bitstream ID update 6026.

The bitstream ID monitor 6024 is in charge of keeping an overview of new added or deleted bitstreams in the database. The Bitstream ID monitor 6024 also records hit and miss ratios of bitstreams and periodically forwards this information to the Network Orchestrator 600.

The bitstream ID update 6026 provides IDs to bitstreams based on requests from the bitstream ID monitor 6024.

As discussed herein, the term "ID" is short for Identifier, and is a synonym for bitstream pointer or bitstream reference.

The central cache controller 602 will be discussed in more detail later with regard to FIG. 9.

Although not shown in FIG. 6, the network architecture further includes a GBD or other central repository.

Figure 7:
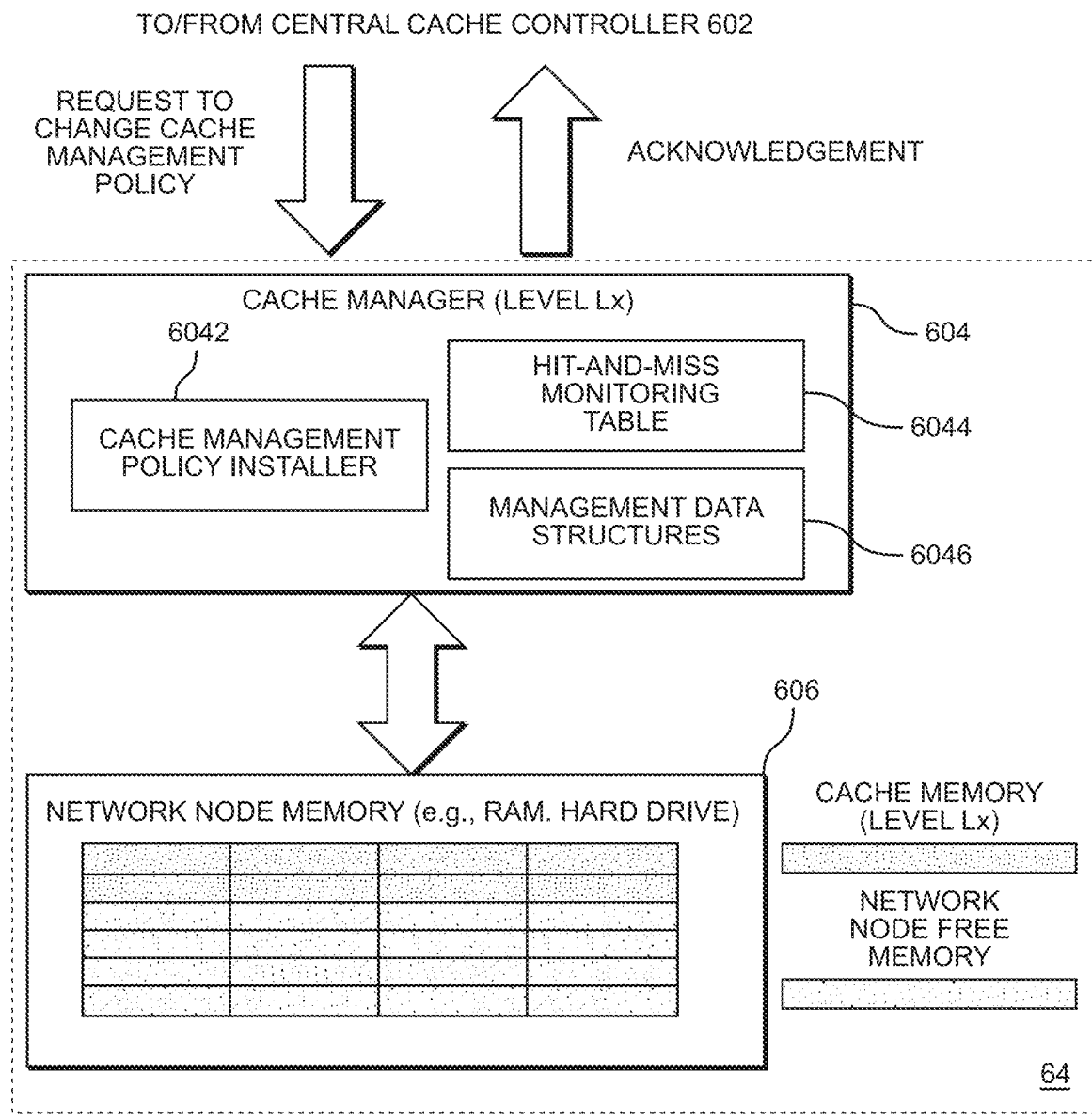
FIG. 7 illustrates a network node according to example embodiments.

FIG. 7 is a block diagram illustrating a network node, according to example embodiments, in more detail. The example shown in FIG. 7 is for the purposes of describing a level Lx cache manager according to example embodiments. Accordingly, the cache manager shown in FIG. 7 may be generic to the levels of the multi-level cache hierarchy according to example embodiments. Although only the network node 64 shown in FIG. 7 will be described in detail, any and/or all of the network nodes shown in FIG. 6 may be implemented as the network node 64 shown in FIG. 7.

Referring to FIG. 7, the network node 64 includes a cache manager 604 and a cache memory 606. The cache memory 606 may be the same or substantially the same as one of the cache memories discussed above with regard to FIG. 3 or 4.

The cache memory 606 is implemented by a network node memory and stores bitstreams for configuring FPGAs.

The cache manager 604 includes a cache management policy installer 6042, a hit-and-miss monitoring table 6044 and management data structures 6046. The hit-and-miss monitoring table 6044 is a local data structure, such as a table, that associates bitstream pointers and integer counters.

The cache manager 604 interfaces with the central cache controller 602 to update the cache management policy for the cache at run-time. The cache manager 604 also parses (e.g., correctly parses) the structure of a cache memory line (FIG. 5) according to the cache management policy being used (e.g., some fields discussed herein are cache management policy specific, but their number and size may also change dynamically). The cache manager 604 also locally monitors hits and misses of bitstreams stored in the cache memory 606.

At a fine grain, the cache manager 604 monitors hits and misses of bitstreams by recording the hits and misses for each bitstream in the hit-and-miss monitoring table 6044. Periodically, using an internal timer, the cache manager 604 sends this data structure, together with its network address (e.g., the network address of the network node) as an identifier, to the central cache controller 602 for use in determining whether to update the cache management policy at the cache manager 604.

The data structures to monitor hits and misses at the cache manager 604 may vary depending on the type of information that must be collected on and on how this information is used. As discussed above, a relatively simple data structure is a LUT addressed by references to the bitstreams, where a counter is incremented each time a hit/miss occurs for the corresponding bitstream. More complicated data structures, however, may also record the location of the cache where the hit/miss occurred and other statistical parameters of interest (e.g., time, type of network service, etc.).

Example operation of the cache manager 604, according to example embodiments, will now be described with regard to FIG. 8.

Figure 8:
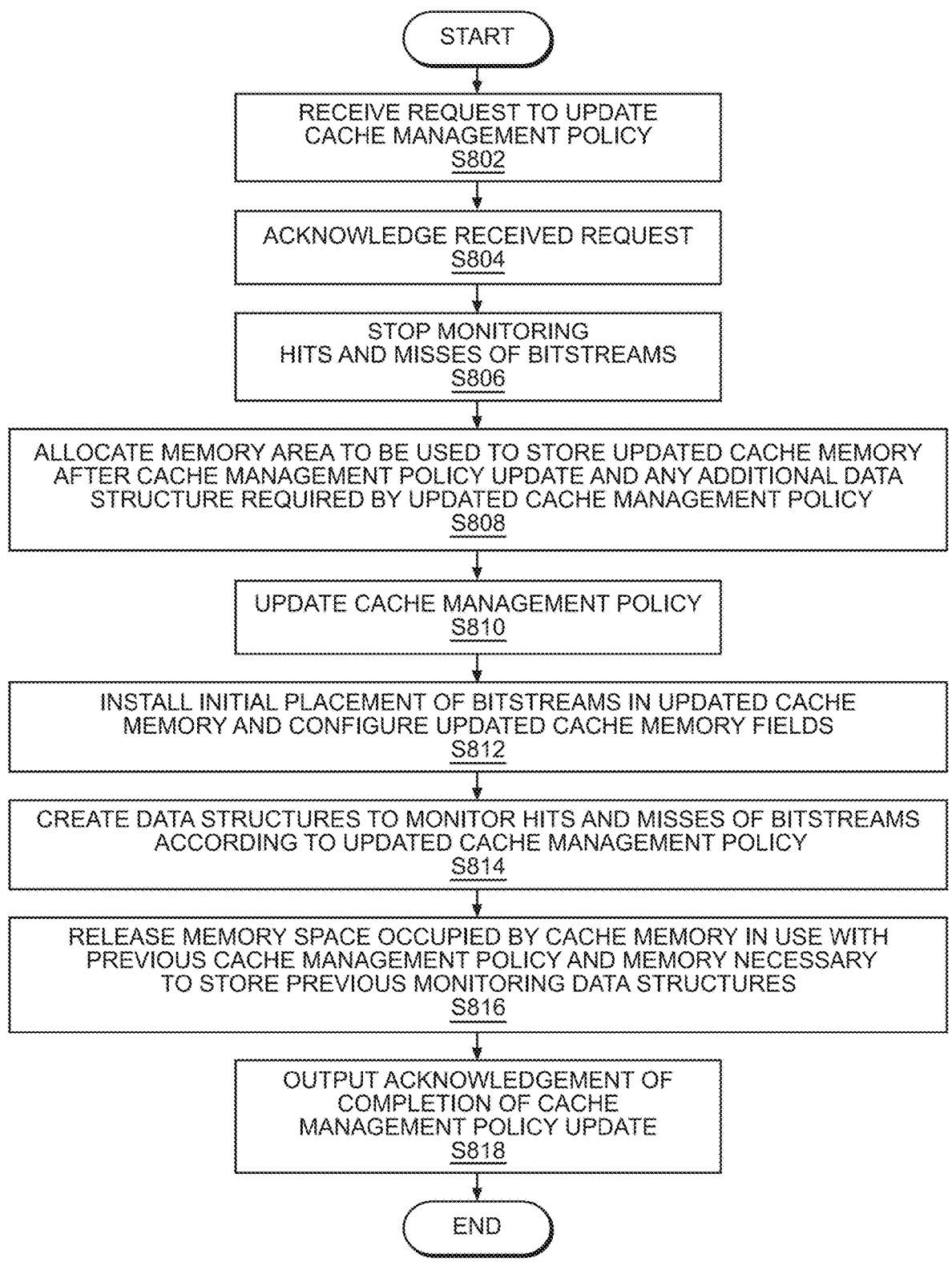
FIG. 8 is a flow chart illustrating a method according to example embodiments.

FIG. 8 is a flow chart illustrating a method according to example embodiments. The method shown in FIG. 8 may be performed by the cache manager 604 to interface with the central cache controller 602 in order to update a cache management policy by exchanging a set of messages there between.

The example embodiment shown in FIG. 8 will be described with regard to operations performed by the cache manager 604. However, it should be understood that example embodiments may be described similarly with regard to the cache management policy installer 6042 and/or the management data structures 6046 performing one or more of the functions/operations shown in FIG. 8.

Referring to FIG. 8, at step S802, the cache manager 604 receives a policy update request message from the central cache controller 602. The policy update request message includes an implementation (e.g., software or hardware) of the new cache management policy to be installed for the cache at the network node 64 and an initial placement for bitstreams within the cache hierarchy.

At step S804, the cache manager 604 acknowledges the policy update request message by sending an ACK message to the central cache controller 602. Although not shown, the central cache controller 602 may continue sending policy update request messages until an ACK message is received from the cache manager 604.

After acknowledging the policy update request message, at step S806 the cache manager 604 stops monitoring the hits and misses of bitstreams. In one example, the cache manager 604 stops monitoring hits and misses by stopping counting of instances of hits (a requested bitstream is found in the cache) and/or misses (a requested bitstream is not found in the cache) for the bitstreams in the cache at the network node 64.

A step S808, the cache manager 604 then allocates a memory area that will be used to instantiate the updated cache memory after the cache management policy update as well as any additional data structure required by the updated cache management policy. In one example, if the update policy is defined as Least Recently Used (LRU), then the timestamp may need to be monitored, and thus added as an additional data structure. An example data structure and discussed herein with regard to FIG. 5. The additional data structure allows the existing cache memory to continue serving any incoming request at the network node 64, without disrupting the network operations.

At step S810, the cache manager 604 (e.g., via the cache management policy installer 6042) installs the updated cache management policy (e.g., allocation of novel data structures). As methods for installing cache management policies are generally known, a detailed discussion is omitted.

At step S812, the cache manager 604 installs the initial placement of bitstreams in the updated cache memory and configures the updated cache memory fields accordingly. In a Kubernetes infrastructure, for example, an initial bitstream placement starts when the Kubernetes master deploys an accelerated service on a worker node. The description of the deployed pod service indicates to the worker node the required bitstream to reconfigure. If the bitstream is not present in a cache among the hierarchy, then the cache manager fetches the required bitstream (e.g., from the GBD). The cache memory fields are simply filled in based on the "physical characteristics of the bitstream."

At step S814, the cache manager 604 creates data structures (e.g., a hit-and-miss monitoring table or LUT) to monitor hits and misses of bitstreams under the updated cache management policy. The data structures to monitor hits and misses vary depending on the type of information that must be collected and on how this information is used. The simplest data structure may be a LUT addressed by references to the bitstreams, where a counter is incremented each time a hit or miss occurs for the corresponding bitstream. More complicated data structures may also record the location of the cache where the hit/miss occurred and other statistical parameters of interest (e.g., time, type of network service, etc.).

At step S816, the cache manager 604 releases the memory space occupied by the cache memory in use with the preceding cache management policy, and the memory necessary to store the preceding monitoring data structures (e.g., the hit-and-miss monitoring table or LUT).

At step S818, the cache manager 604 outputs an indication that the cache management policy for the Lx cache at the network node 64 is complete to the central cache controller 602.

As mentioned above, the central cache controller 602 determines whether cache management policies at network nodes need updating based on hit-and-miss information received periodically from cache managers at the network nodes. The central cache controller 602 may run a dedicated service to analyze cache hits and misses (or hit and miss ratios). If too many misses are detected (or the ratio of hit-to-miss falls below a minimum threshold) for a given cache, then the central cache controller 602 determines that updating of the cache management policy for the cache is necessary to reduce the number of cache misses. In one example, the central cache controller 602 may decide to change the replacement algorithm to a Least Frequently Used (LFU) algorithm, rather than a least recently used (LRU) algorithm.

To decide when to dynamically update a cache management policy, the central cache controller 602 may utilize the performance of the entire cache hierarchy (levels L1 through L3) in terms of the hits and misses, which are monitored locally by the cache manager 604.

According to one or more example embodiments, upon occurrence of a miss in a cache (e.g., a required bitstream is not present in the LBD), remaining caches in the hierarchy (e.g., CBD and SBD) are searched until a hit occurs. If no hit occurs, then the cache manager 604 fetches the bitstream from the GBD. The requested bitstream is then provided to the cache nearest to the requesting FPGA. This bitstream is fetched from the GBD along with bitstreams associated with pointers that are located relatively close to the requested bitstream. In one example, the fetching of a bitstream having pointer ABC that is specifically needed for a user (e.g., user U) on a FPGA (e.g., FPGA F) may also result in fetching of bitstreams located at nearby pointers ABB and ACC from the GBD. Searching for bitstreams and pointers for bitstreams will be discussed in more detail later.

According to one or more example embodiments, a unique pointer acts as a global reference that may evolve at run-time and is used to access a lookup table at the central cache controller 602. Here, the pointer may be converted to a physical reference that defines the location of the bitstream in the GBD (or other central repository).

In the context of FPGAs, bitstreams are requested by users in a marketplace based on their popularity. One or more example embodiments provide a mechanism to associate a reference to the location of the bitstream in the distributed shared-memory to pointers that considers both the attributes of a bitstream that are fixed offline at design time (static characteristics, such as Function type, such as artificial intelligence (AI), machine learning (ML), video, telecommunication, etc., Bitstream provider, Targeted FPGA model, Targeted FPGA partition ID, Design type, etc.) and dynamic characteristics that evolve at run-time, such as the popularity of bitstreams.

Static characteristics (e.g., the first 3 columns from the left in FIG. 5) do not evolve over time since they are not modifiable after bitstream synthesis. Static characteristics may be used to create initial pointers. To enhance the efficiency of the pointer-based referencing according to example embodiments, initial pointers for bitstreams may be updated based on dynamic characteristics, which are at least partially based on popularity of the bitstream at run-time.

Several mechanisms may be designed to correlate a pointer with the popularity of a bitstream. One example mechanism is to monitor the frequency of use of a bitstream pointer and periodically update the pointers based on their frequency of utilization. To this end, the update may be performed so that popular bitstreams are associated with pointers close in the mathematical space of other pointers. In this way, once a bitstream with, for example, pointer ABC is fetched from a cache (regardless of cache level), bitstreams with similar pointers (e.g., ABB and ACC) that have similar popularity are also fetched and will be more rapidly accessible for future requests.

To increase efficiency, pointers may also be similar if the corresponding bitstreams are executable by the same FPGA (e.g., an FPGA prepared for the same design, with the same number of users and the same partitions).

According to one or more example embodiments, other dynamic characteristics for updating pointers may include the value of a bitstream, the functionality of a bitstream, or the like.

The value of a bitstream allows for relatively costly bitstreams, which are more often requested and hence are more popular, to be fetched together in a cache memory. Here, pointers are associated with (e.g., directly associated with) a bitstream monetary value in the network marketplace.

The functionality of a bitstream allows bitstreams with similar functionalities to be fetched together. Functionally similar bitstreams may be more frequently requested by users who are all interested in a certain application domain (e.g., machine learning, DNA sequencing, image processing, webpage ranking, etc.) at a given moment in time. For instance, during the Covid-19 crisis, medical laboratories are all interested in accelerating computations to sequence the virus' DNA or perform some sort of medical analysis concerning infected patients, etc. Thus, functionally similar bitstreams that perform these operations are in relatively high demand and more frequently requested.

According to one or more example embodiments, the central cache controller 602 may generate and update a pointer for a bitstream by combining (e.g., concatenation) of a static (fixed) part and a dynamic part (that evolves at run-time).

The central cache controller 602 may generate the static part (value v1) by applying a hash function $f1$ to the static characteristics $Char_{Static}$ of the bitstream as shown below in Equation (1). As discussed earlier, one example of a static characteristic is FPGA design.

$$f1(Char_{Static}) = v1 \qquad (1)$$

The central cache controller 602 may generate the dynamic part (value v2) by applying another (e.g., different) hash function $f2$ to the utilization frequency of a bitstream (bitstream B utilization frequency) as shown below in Equation (2).

$$f2(\text{bitstream } B \text{ utilization frequency}) = v2 \qquad (2)$$

According to one or more example embodiments, any suitable hash function may be used to generate the static and dynamic parts. For example, if the static and dynamic characteristics of a bitstream are encoded as positive integers, then "modular hashing" may be used. In this example, the array size of the hash table is chosen to be a prime number M, and for any key value k (in this case the static or dynamic characteristic of a bitstream), the modular hashing algorithm computes the hash value (v1 in Equation 1 or v2 in Equation 2) as the remainder of the k/M. Efficient modular hashing functions take as input the binary representation of keys. The same method may also be applied to compute the joint hash value of both static and dynamic characteristics, altogether (with a single hash operation). In this case, the key k is given by the integer that results from the juxtaposition of the integer key for the static characteristic and the integer for the dynamic characteristic of a bitstream.

The central cache controller 602 may then generate the pointer pointer for a bitstream based on the static part v1 and the dynamic part v2. According to one or more example embodiments, the central cache controller 602 may combine the static part v1 and the dynamic part v2 to generate the pointer pointer as shown below in Equation (3).

$$\text{pointer} = v1v2 \qquad (3)$$

In at least one example, the central cache controller 602 may generate the pointer pointer by simple combination (juxtaposition) of the static part v1 and the dynamic part v2, where the left-most X bits of the pointer pointer are given by the static part v1 and the right-most Y bits of the pointer pointer are given by the dynamic part v2.

The generated pointers may be used (e.g., by the central cache controller 602 or the cache managers) to, among other things, access a table that is stored in the GBD (or other central repository). Initially, the dynamic part v2 may be empty or be a random value.

The central cache controller 602 may re-compute a pointer for a bitstream at runtime by removing the current value of the dynamic part v2 and concatenating a new value of the dynamic part v2' to the existing value of the static part v1.

By monitoring of hits and misses described above, both the central cache controller 602 and the cache managers 604 have knowledge of the utilization frequency of a bitstream. This is equal to the sum of the hit and miss counters for that bitstream.

The cache manager may periodically update the pointers for bitstreams stored in the corresponding cache memory. In one example, the update may take place periodically when the hit and miss counters are sent to by the cache manager to the central cache controller. In this example, upon receipt of this information, the central cache controller updates the pointers of all available bitstreams, and then updates the entries in the GBD (or other central repository) so that the updated pointers may be used to retrieve the same bitstreams as the previous pointers.

Following this update, there is no need to reposition (e.g., evict, insert) bitstreams in the cache hierarchy according to the updated pointers. The old pointers are simply relabeled to better reflect the popularity of a bitstream, which was already implicitly given by the presence/absence of a bitstream in a given cache. The pointers of bitstreams in each cache become closer in the mathematical space of pointers and become more efficient and effective for subsequent requests.

The central cache controller 602 monitors the hit and miss ratios for caches and periodically forwards this information to the network orchestrator 600. The central cache controller 602 may monitor the hit and miss ratios of the caches in any suitable manner. In one example embodiment, the cache manager 604 locally monitors the number of hits and misses for each bitstream in a dedicated data structure (e.g., the hit-and-miss monitoring table 6044). Periodically, the cache manager 604 sends the hit-and-miss monitoring table 6044, together with the network address of the cache manager 604 as an identifier, to the central cache controller 602. The central cache controller 602 has a local data structure that is global for all bitstreams in the network. The global data structure (bitstream ID monitor 6024) at the central cache controller 602 differs from the global data structure of the cache manager 604 in that the global data structure at the central cache controller 602 stores an identifier (ID) for the specific cache management policy that is currently being executed by the cache manager 604 as well as its implementation type (hardware or software). This information is needed by the network orchestrator 600 to understand if a given policy is effective or not, under certain network operating conditions.

The central cache controller 602 updates its global data structure (bitstream ID update 6026) with the information contained in the local copy of a cache manager 604. Using an internal timer, the central cache controller 602 periodically sends a copy of this global monitoring data structure to the network orchestrator 600.

Still referring to FIGS. 6 and 7, the network orchestrator 600, according to the network working conditions (e.g., congestion, quality of service requirements, or the like), may request that the central cache controller 602 change the cache management policy that is currently used by cache managers at a set of network nodes from among worker nodes Node 1, Node 2, . . . Node n in FIG. 6 so that performance complies with one or more threshold requirements. The set of network nodes may include all network nodes or a portion (subset) of all network nodes in FIG. 6.

The central cache controller 602 includes of a library of cache management policies 6022. The library of cache management policies 6022 includes different implementations of such policies (e.g., FPGA bitstreams for cache managers embodied in the FPGA hardware, software modules for managers running on CPUs, etc.). This library may be developed offline and may be updated at run-time by the network orchestrator 600. The library may be stored in a memory, as a data structure such as a LUT that is accessed with policy IDs and whose values are a pair of implementations (e.g., a hardware and a software implementation) for a given policy.

Figure 9:
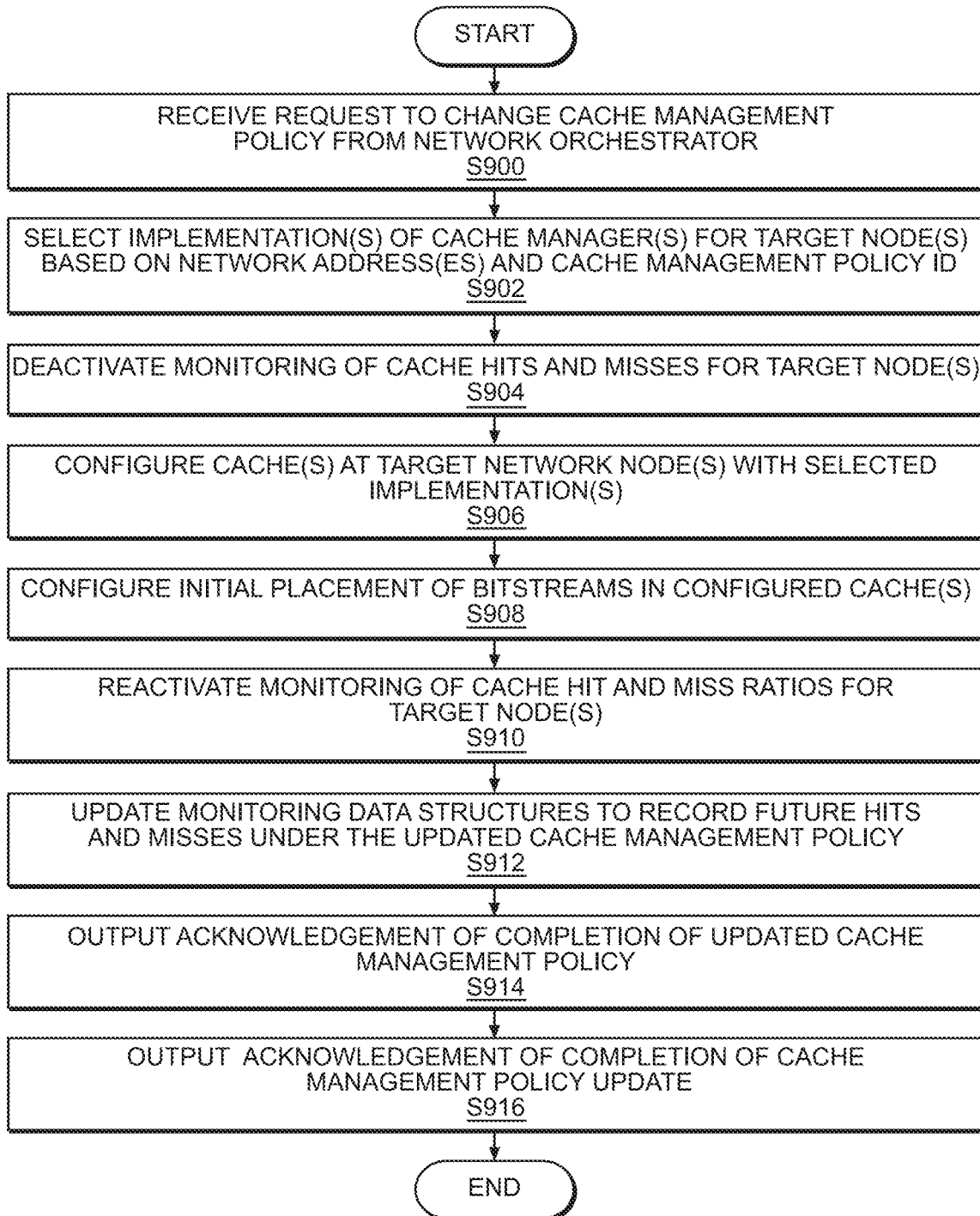
FIG. 9 is a flow chart illustrating another method according to example embodiments.

FIG. 9 is a flow chart illustrating a method for updating cache management policy according to example embodiments. For example purposes, the method shown in FIG. 9 will be discussed as being performed by the central cache controller 602 in FIG. 6 and involving updating of the cache management policy at the network node 64 in FIG. 7. However, example embodiments should not be limited to this example. In the least, the central cache controller 602 may update multiple caches at multiple network nodes concurrently and/or simultaneously.

Referring to FIG. 9, at step S900 the central cache controller 602 receives a request to change the cache management policy at, among others, the network node 64 from the network orchestrator 600.

The request includes an ID for the new cache management policy in the library of cache management policies 6022 to deploy and the network addresses of the cache manager 604 (or network node 64) at which the cache management policy is to be updated.

In response to the received request, at step S902 the central cache controller 602 accesses the library of cache management policies 6022 to select or obtain the cache management policy for the implementation (e.g., hardware or software implementation) of the cache manager 604 for the network node 64 (target network node) based on the network addresses and the cache management policy ID from the network orchestrator 600.

At step S904, the central cache controller 602 deactivates (stops) monitoring of cache hit and miss ratios for the network node 64 (the target network node identified in the request). In at least one example embodiment, the central cache controller 622 deactivates the monitoring of cache hit and miss ratios for the network node 64 by sending an instruction message to the cache manager 604 instructing the cache manager 604 to stop the monitoring.

At step S906, the central cache controller 602 configures the cache at the network node 64 with the cache management policy implementation selected form the library of cache management policies 6022 at step S902. In one example, the central cache controller 602 configures the cache at the network node 64 by outputting the cache management policy implementation to the cache manager 604. During this process the cache at the network node 64 is temporarily deactivated and any access to the cache is automatically denied.

At step S908, the central cache controller 602 configures the initial placement of bitstreams in the updated cache at the network node 64. In one example, the central cache controller 602 instructs the cache manager 604 to install the initial placement of bitstreams in the updated cache as described above with regard to step S812 in FIG. 8.

At step S910, after configuring the initial placement of bitstreams, the central cache controller 602 reactivates the monitoring of cache hit and miss ratios for the target cache. In one example, the central cache controller 602 instructions the cache at the network node 64 to begin sending hit and miss information to the central cache controller 602 periodically.

At step S912, the central cache controller 602 updates the monitoring data structures (e.g., a LUT) to record that future hits and misses occurred with the updated cache management policy. In one example, the central cache controller 602 instructs the cache manager 604 at the network node 64 to update the data structures (e.g., a LUT) to monitor hits and misses of bitstreams according to the updated cache management policy as discussed above with regard to step S814 in FIG. 8. In one example, based on the instruction from the central cache controller 602, the cache manager 604 at the network node 64 may reset the data structures (e.g., LUT) to track hits and misses for the updated cache management policy. In the case a different LUT (e.g., one with more entries) is needed by the updated cache management policy, as opposed to the LUT used by the previous policy, the cache manager 604 may install a new LUT or other data structure thus overwriting the memory area storing the previous LUT or other data structure.

At step S914 the central cache controller 602 outputs an acknowledgement signal to the network orchestrator 600 indicating completion of the reconfiguration/updating of the cache management policy at the network node 64.

According to one or more example embodiments, the network orchestrator 600 may send update messages to the central cache controller 602 to update the library of cache management policies 6022. These update messages include the cache management policy IDs followed by the pair of software and hardware implementations for the policy. Library updates may also be possible for single hardware or software implementations. In this case, the update messages contain the cache management policy ID with a single implementation and a tag specifying whether the implementation is a hardware or a software implementation.

According to one or more example embodiments, updates of bitstream pointers and cache management policies may occur periodically, but not at the same time. As a result, the central cache controller 602 may delay the update of cache management policies if a request from the network orchestrator 600 arrives when the timer for updating the bitstream pointers expires.

Figure 10:
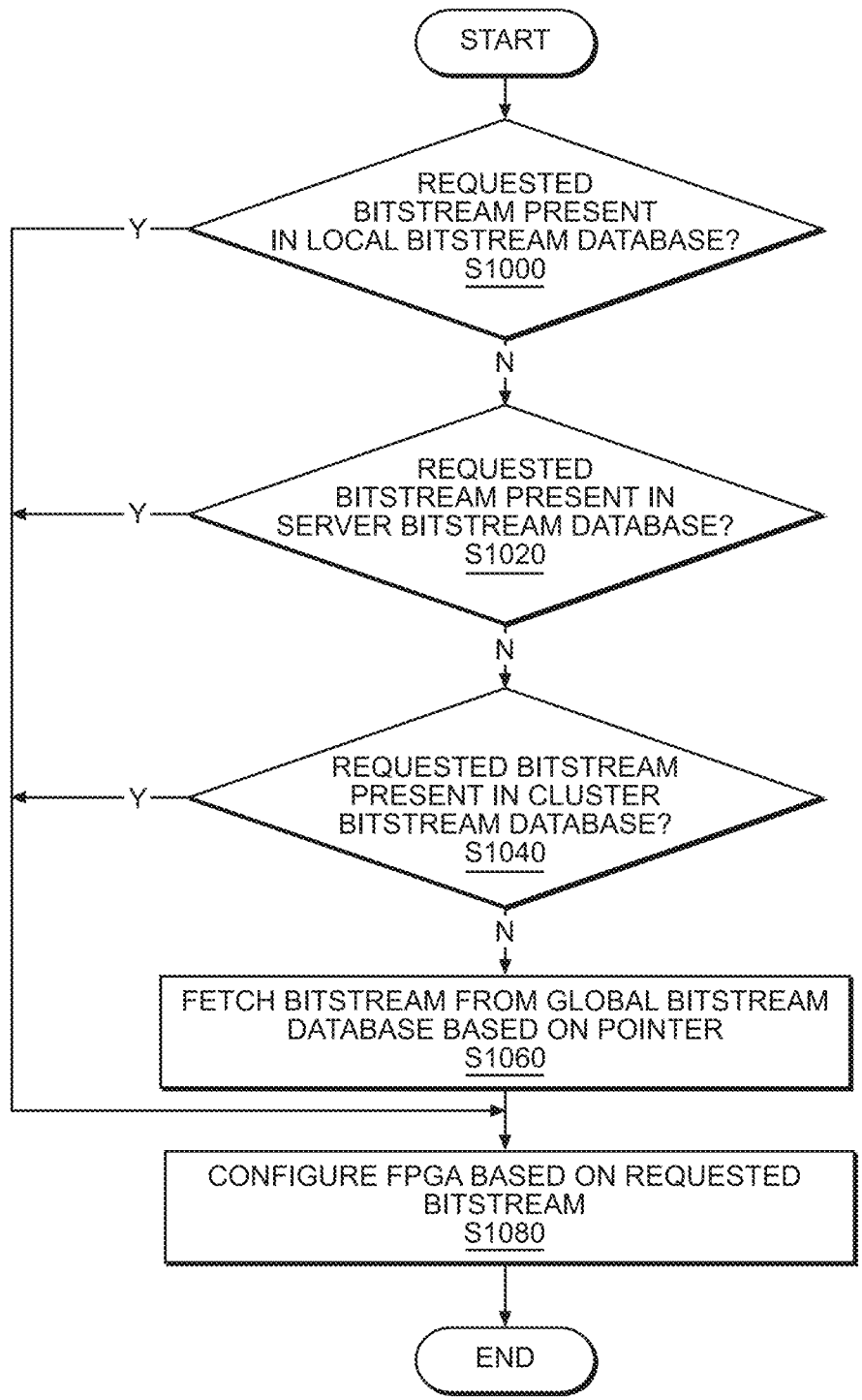
FIG. 10 is a flow chart illustrating another method according to example embodiments.

FIG. 10 is a flow chart illustrating a method for obtaining a requested bitstream according to example embodiments. For example purposes, the example embodiment shown in FIG. 10 will be described with regard to the example embodiments shown in FIGS. 6 and 7.

Referring to FIG. 10, in response to receiving a request for a bitstream, the cache manager 604 searches the L1 cache (LBD) for the requested bitstream. The cache manager 604 may search the LBD based on a pointer associated with the requested bitstream.

If the requested bitstream is found in the LBD, then at step S1080 the cache manager 604 configures the FPGA according to the located bitstream. The cache manager 604 may configure the FPGA by loading the located bitstream onto the FGPA as is known in the art.

Returning to step S1000, if the requested bitstream is not present in the LBD, then at step S1020 the cache manager 604 determines whether the requested bitstream is present in the L2 cache (SBD). The SBD may be located at the network node 64 or at one or more other network nodes at the same sled as the network node 64. The cache manager 604 may search the SBD based on the pointer associated with the requested bitstream in the same or substantially the same manner as with regard to the LBD.

If the requested bitstream is found in the SBD, then the process proceeds to step S1080 and continues as discussed herein.

Returning to step S1020, if the requested bitstream is not present in the SBD, then at step S1040 the cache manager 604 determines whether the requested bitstream is present in the L3 cache (CBD). The CBD may be located at the network node 64 or at one or more other network nodes at the same server rack as the network node 64. The cache manager 604 may search the CBD based on the pointer associated with the requested bitstream in the same or substantially the same manner as with regard to the LBD.

If the requested bitstream is found in the CBD, then the process proceeds to step S1080 and continues as discussed herein.

Returning to step S1040, if the requested bitstream is not present in the CBD, then at step S1060 the cache manager 604 fetches the requested bitstream from the GBD based on the pointer associated with the requested bitstream. The cache manager 604 fetches the requested bitstream from the GBD along with bitstreams having pointers that are located relatively close to the requested bitstream. As mentioned above, in one example, the fetching of the requested bitstream (e.g., a bitstream having pointer ABC) may also result in fetching of bitstreams located at nearby pointers (e.g., ABB and ACC) from the GBD.

To provide for a reduced (e.g., minimum) deterministic bound on the latency of the cache hierarchy, one or more example embodiments provides for pre-fetching bitstreams required by a network service as well as the input data of the bitstream in the cache hierarchy. Pre-fetching may be performed in parallel with the deployment of the network service (e.g., a Virtual Machine), which is a relatively time consuming process, to reduce latency of configuring an FPGA. For example, while the image of a network service is being deployed, the bitstreams and input data needed by the network service may be pre-fetched (e.g., from the GBD) and pre-loaded into the cache hierarchy. This may reduce un-necessary cache misses when beginning execution of a network service and/or provide for a minimum bound on deterministic access to the cache hierarchy.

According to one or more example embodiments, bitstreams are not referenced in an addressable space, but by pointer that are dynamically updated at run-time to enforce spatial and temporal locality of caches. Accordingly, miss ratios of bitstreams may be reduced.

According to one or more example embodiments, cache memory architecture and cache managers are not fixed, but may dynamically change as requested by the network orchestrator to match some desired performance requirements in response to changes in the network operating conditions.

One or more example embodiments may be implemented in existing hardware/software systems, without the need to instantiate new specifically-designed devices. Accordingly, example embodiments support of Application Specific Integrated Circuits (ASICs) need not be provided. Cache memory lines may be stored in the existing memory of network nodes (e.g., RAM) and the cache control logic is implemented in the existing FPGA reconfiguration fabric or embodied in software modules executed by CPUs at servers.

One or more example embodiments may improve access speed for more frequently used bitstreams in shared FPGAs. Reliability and fault tolerance may also be improved as multiple copies of a bitstream are stored in a different level of the hierarchy.

One or more example embodiments may also provide deterministic boundaries on latency as a result of pre-fetching of bitstreams.

Example embodiments may reduce network latency. Reducing latency may result in execution of more services in less time, which may result in FPGA hardware more often available for rental, which may result in more profit for network operators/manufacturers.

One or more example embodiments may be monetized in marketplaces for cloud data-centers.

One or more example embodiments provide more efficient reduction in access times of bitstreams that are relatively frequently used in a web scale infrastructure.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network apparatuses, elements or entities including cloud-based data centers, computers, cloud-based servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network apparatus, network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network apparatuses, elements or entities including cloud-based data centers, computers, cloud-based servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A network-based apparatus comprising:
   at least one processor; and
   at least one memory including computer program code, the at least one memory and the computer program code configured to, with the at least one processor, cause the network apparatus to
   configure a cache manager according to a cache management policy identified in a request from a network orchestrator, the cache manager managing a cache of a multi-level cache hierarchy, the cache storing bitstreams for configuring a programmable device, and
   dynamically update pointers for the bitstreams at runtime based on changes to dynamic characteristics of the bitstreams, a pointer for a bitstream, among the pointers for the bitstreams, being based on at least one static characteristic and at least one dynamic characteristic, among the dynamic characteristics, the at least one dynamic characteristic including a frequency of request of the bitstream, and the at least one static characteristic including at least one of FPGA model, bitstream producer or shell type for the bitstream.

2. The network-based apparatus of claim 1, further comprising:
   a library of cache management policies; wherein
   the at least one memory and the computer program code are configured to, with the at least one processor, cause the network apparatus to obtain the cache management policy from the library of cache management policies based on the request from the network orchestrator.

3. The network-based apparatus of claim 1, wherein the at least one memory and the computer program code are configured to, with the at least one processor, cause the network apparatus to generate the pointers for the bitstreams based on static characteristics and the dynamic characteristics of the bitstreams.

4. The network-based apparatus of claim 3, wherein the static characteristics include at least one of FPGA model, bitstream producer or shell type for the bitstreams.

5. The network-based apparatus of claim 3, wherein the dynamic characteristics include a number of prior instantiations of the bitstreams.

6. The network-based apparatus of claim 3, wherein the at least one memory and the computer program code are configured to, with the at least one processor, cause the network apparatus to dynamically update the pointers for the bitstreams at runtime based on changes to the dynamic characteristics of the bitstreams.

* * * * *